United States Patent
Werling et al.

(10) Patent No.: US 6,456,856 B1
(45) Date of Patent: Sep. 24, 2002

(54) MOBILE RADIO EQUIPMENT FORMING ANTENNA PATTERN TO PROJECT USER FROM RADIATION

(75) Inventors: Thierry B. F. Werling; Raul A. Bruzzone, both of Le Mans (FR)

(73) Assignee: Koninklijke Philips Electronics N.V. (NL)

(*) Notice: Subject to any disclaimer, the term of this patent is extended or adjusted under 35 U.S.C. 154(b) by 0 days.

(21) Appl. No.: 09/361,074

(22) Filed: Jul. 26, 1999

(30) Foreign Application Priority Data

Jul. 28, 1998 (FR) .............................. 98 09651

(51) Int. Cl.[7] .............................................. H04B 1/38
(52) U.S. Cl. ........................................ 455/550; 455/129
(58) Field of Search ................................ 455/129, 121, 455/125, 550, 90

(56) References Cited

U.S. PATENT DOCUMENTS

| 5,229,975 A | | 7/1993 | Truesdell et al. ............ 367/107 |
|---|---|---|---|
| 5,274,844 A | * | 12/1993 | Harrison et al. ............. 342/368 |
| 5,541,609 A | * | 7/1996 | Stutzman et al. ............ 343/702 |
| 5,729,238 A | | 3/1998 | Walton et al. ............... 343/704 |
| 5,805,067 A | * | 9/1998 | Bradley et al. .............. 340/552 |
| 5,924,020 A | * | 7/1999 | Forssen et al. .............. 342/373 |
| 5,956,626 A | * | 9/1999 | Kaschke et al. ............. 340/552 |
| 5,995,862 A | * | 11/1999 | Gallorini ..................... 250/372 |

FOREIGN PATENT DOCUMENTS

EP         0752735 A1     1/1997    ............ H01Q/1/24

* cited by examiner

Primary Examiner—Daniel Hunter
Assistant Examiner—Nick Corsaro
(74) Attorney, Agent, or Firm—Dicran Halajian

(57) ABSTRACT

A radio communication apparatus includes a transceiver coupled to an antenna structure with many directional antennas that form a radiation pattern. The antenna structure gives greater importance to certain directions of transmission. A power regulation device is controlled by a control element for modifying the radiation pattern. The control element includes switches for selectively activating/deactivating the directional antennas to modify the radiation pattern. A proximity detection device measures at least one proximity parameter and feeds the control element with a proximity indication for controlling the power regulation device to reduce the radiation pattern in the direction of the radio communication apparatus user. The proximity detection device includes a humidity and/or a temperature detector.

12 Claims, 3 Drawing Sheets

MOBILE RADIO EQUIPMENT FORMING ANTENNA PATTERN TO PROJECT USER FROM RADIATION

FIELD OF THE INVENTION

The invention relates to a radio communication apparatus comprising:
- transceiver means coupled to an antenna structure featuring a radiation diagram which antenna structure gives greater importance to certain directions of transmission and
- a power regulation device controlled by a control element for modifying said radiation diagram.

The invention also relates to mobile radio equipment suitable for communicating with at least one radio base station of a radio telecommunication system, said equipment comprising:
- radio transceiver means coupled to an antenna structure featuring a radiation diagram which antenna structure gives greater importance to certain directions of transmission and
- a power regulation device controlled by a control element for modifying said radiation diagram.

The invention further relates to a radio base station of a radio telecommunication system suitable for communicating with at least one mobile radio terminal, said station comprising:
- radio transceiver means coupled to an antenna structure featuring a radiation diagram which antenna structure gives greater importance to certain directions of transmission and
- a power regulation device controlled by a control element for modifying said radiation diagram.

The invention finally relates to a power control method for controlling the power radiated in a given direction by a plurality of directional antennas which have respective transmit powers.

The invention finds many applications in the field of telecommunication by radio channel, notably radiotelephony. The invention particularly applies to systems called third generation systems, operating according to a Universal Mobile Telecommunications System (UMTS) standard using the technique of Code-Division Multiple Access (CDMA). Equipment provided for such systems comprises a plurality of directional antennas suitable for emitting noxious radiation absorbed by human tissue situated in the proximity of these apparatus.

BACKGROUND OF THE INVENTION

European patent application no. EP 752 735, published in the German language, describes an apparatus of the type defined in the opening paragraph, comprising means for limiting the power of radiation absorbed by human tissue. The apparatus comprises an antenna array electrically connected to a control unit for individually regulating the transmit power of each antenna as a function of the calculated variation between the impedance measured at the level of the antenna and a reference value corresponding to its impedance in the clear field. This difference represents a measure of the radiation power absorbed by human tissue.

SUMMARY OF THE INVENTION

The present invention proposes means for avoiding the emission of radio waves in the direction of human tissue, which means are easier to implement and more effective than those described in cited document. Therefore, an apparatus as mentioned in the opening paragraph is provided, characterized in that it comprises a proximity detection device for measuring at least one proximity parameter and feeding the control element with a proximity indication for controlling the power regulation device.

According to an important characteristic feature of the invention, the antenna structure comprises a plurality of directional antennas which have each a transmit power in a given direction and the power regulation device comprises power control means for regulating the transmit power of the directional antennas.

According to another characteristic feature of the invention, the power control means comprise a switch for selectively activating/deactivating one or various directional antennas.

According to two particular embodiments of the invention, the proximity detection device comprises a temperature detector and/or a humidity detector enabling to distinguish, among the various obstacles to the radio propagation, the presence of a human being in any obstacle. As it is an object of the invention to limit the emission of noxious radiation for the benefit of the user's health, it is very advantageous to use such proximity detectors.

These detectors further feature two additional advantages. As they are passive, they are harmless to the user, because they emit no radio wave at all. Moreover, they make both the transmit power measurements and the calculations of the power differences recommended by the method cited previously redundant. These detectors are not only energy consumers but are also noxious, since they imply to transmit at a certain power level for making the measurements before possibly effecting a power level control intended to limit the user's absorption of radiation.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
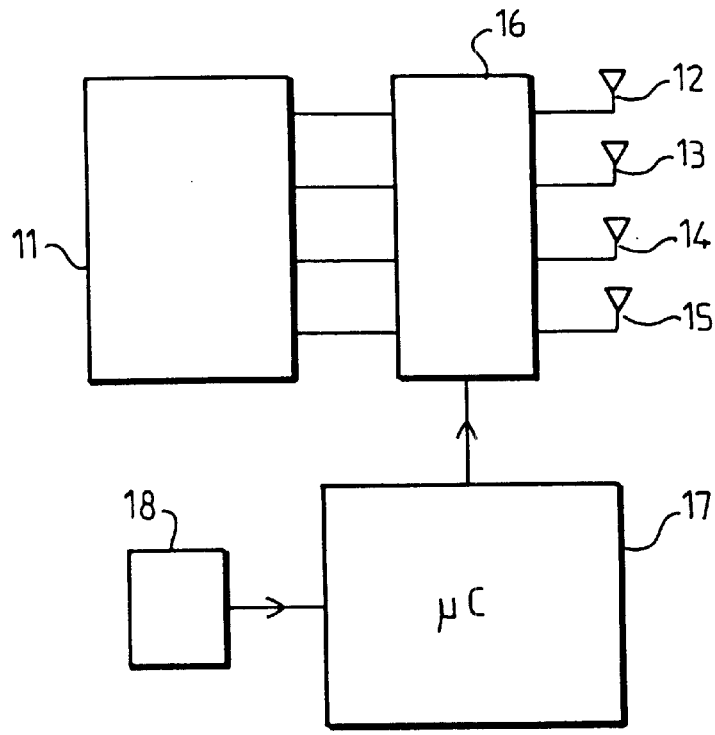
FIG. 1 is a block diagram of a communication apparatus according to the invention.

The example represented in FIG. 1 may be integrated with a radiotelephone using various directional transmitting antennas. The communication apparatus comprises a transceiver device 11 coupled to a plurality of directional antennas 12 to 15 (having a radiation diagram giving greater importance to certain directions of transmission). Each antenna is electrically connected to a power regulation device 16 controlled by a control element 17. Such an element may be formed by a suitably programmed microcontroller $\mu C$ which includes a programmable read-only memory, a random-access memory, an input/output interface having an analog/digital converter and a digital/analog converter and all the devices necessary for the interface with the various peripherals.

A proximity detector 18 connected to the control element 17 detects the presence of human tissue in the proximity of the apparatus by measuring a proximity parameter, such as temperature or degree of humidity, and transmits a proximity coefficient characteristic of the detected object to the control element 17. Such a detector is thus capable of differentiating between a human body featuring a certain coefficient and another body having a different coefficient. The value of this coefficient is analyzed by the control element 17 and compared to set values stored in, for example, the read-only memory to determine, in dependence on their preferred directions of transmission, which are the directional antennas whose transmit power is to be reduced and to trigger an appropriate control of the power regulation device 16.

Under the control of the control element 17, the power regulation device 16 selects one or various antennas and adjusts their transmit power as a function of the data produced by the detector 18.

On reception, when the generated powers are considerably smaller than on transmission, all the directions of radiation may be used without a danger to the user.

According to a preferred embodiment of the invention, the proximity detector 18 is a passive type of infrared thermometer, capable of measuring the temperature of a body at a distance of about 20 cm from the detector. A variant consists of the use of a humidity detector.

Preferably, the power regulation device 16 comprises a switch (not shown) controlled by the control element 17 for individually activating or deactivating the selected antennas and radically suppressing the contribution of the deactivated antennas whose radiation diagram features a lobe in the direction of transmission to be avoided.

Figure 2:
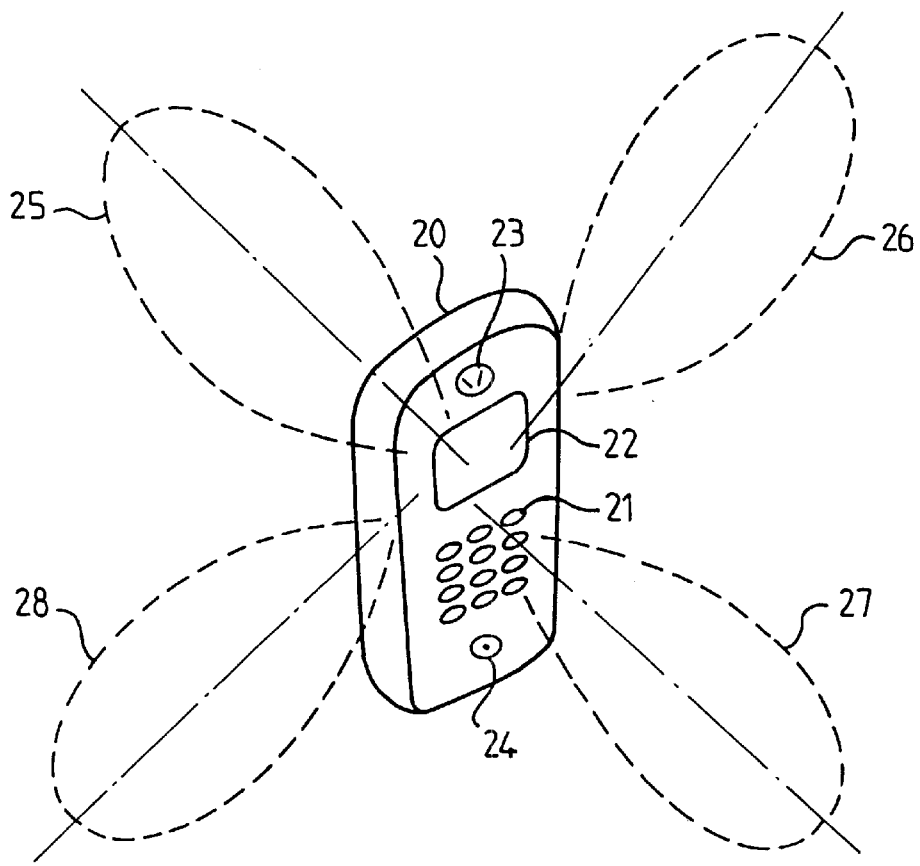
FIG. 2 represents an example of the mobile radio equipment according to the invention.

FIG. 2 is a perspective view of a radiotelephone comprising a structure of an antenna operating in the transceiving mode whose radiation diagram, simplified by main lobes, is represented by dotted lines. The use of separate antennas for transmission and reception is advocated when the frequency bands used for transmission and reception respectively, are too far away for them to be compatible with the passband of the antennas. On the other hand, the size of the apparatus is to be adapted to accommodate a large number of antennas, which is actually the case with equipment operating with frequencies in the gigahertz domain.

The example illustrated by FIG. 2 comprises a housing 20, a keyboard 21, a control display 22, an earphone 23, a microphone 24 and an antenna structure comprising four independent directional transmitting antennas situated inside the housing 20. These antennas are formed by, for example, ceramic discs which form a radiation diagram whose main lobes 25, 26, 27, 28 point in four orthogonal directions. In lieu of a system with various independently controllable antennas, one may use an adjustable miniaturized network antenna of the "phased-array type" like the one described in detail in the manual "Mobile Antenna Systems Handbook", K. Fujimoto et al., Artech House Inc., 1994, pp. 436–451.

Figure 3:
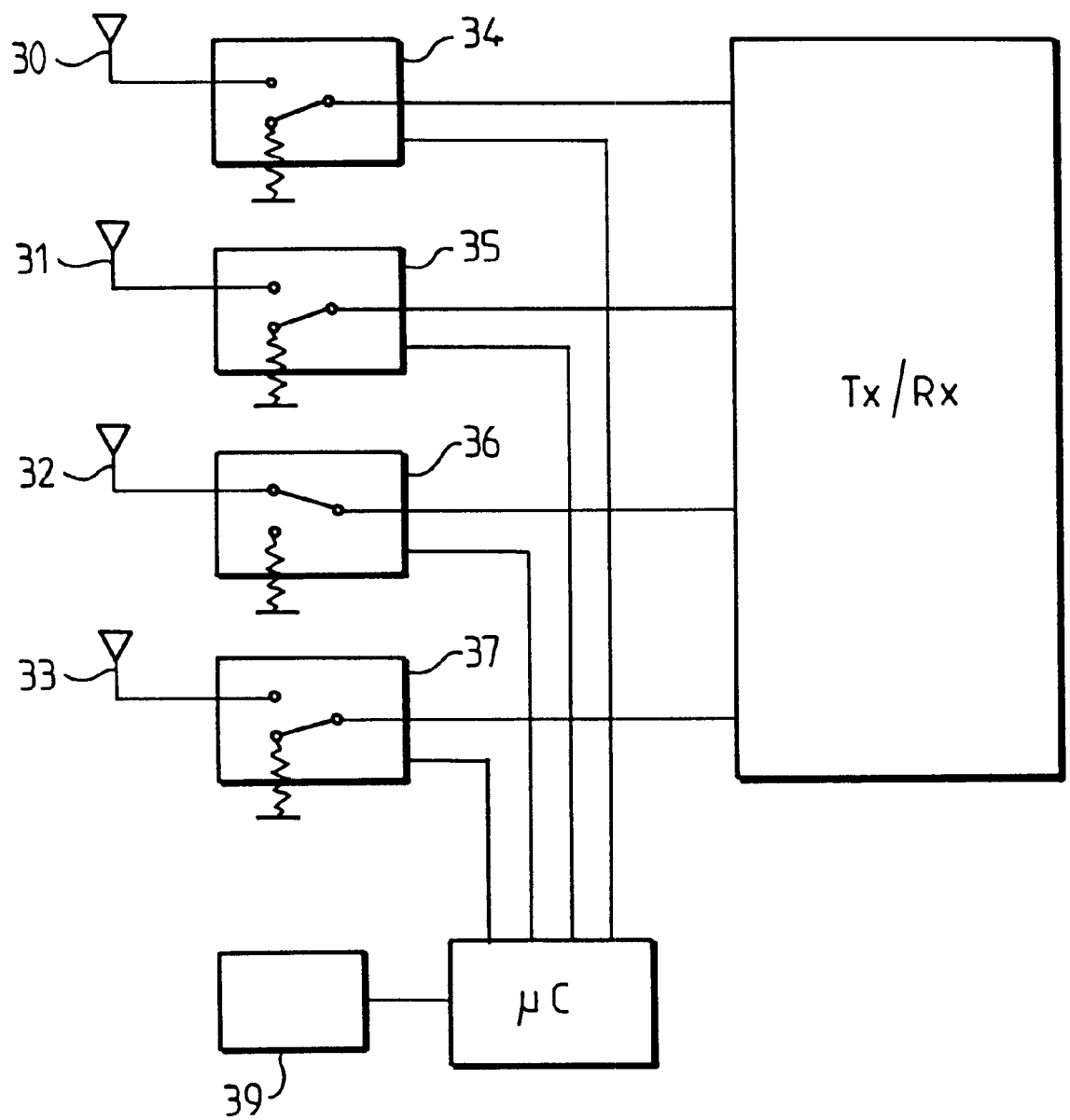
FIG. 3 is a block diagram of a particular embodiment of the equipment represented in FIG. 2.

FIG. 3 is a block diagram illustrating the operation of the radiotelephone represented in FIG. 2. The antennas 30 to 33 are coupled, on the one hand, to transceiver circuits Tx/Rx by means of a duplexer, and on the other hand to switches 34 to 37 controlled by a control element μC as a function of data it receives from a proximity detector. The transceiver circuits known to a person of ordinary skill in the art will not be described here. It will be simply recollected that a transmitting circuit coupled to an antenna structure includes at least a power amplifier. In the case of a plurality of transmitting antennas, the radiotelephone is to comprise as many power amplifiers and transmitting circuits as there are antennas whose transmit power is to be controlled independently of the transmit power of the other antennas.

According to a preferred embodiment of the invention, the detection of human tissue by the proximity detector 39 triggers the control by the control element μC of the appropriate switches for deactivating the antennas whose radiation diagram points to the user's head. In the example with four antennas represented in FIG. 2, the antenna producing the lobe 27 will generally have to be deactivated.

For a use in a propagation medium that gives greater importance to multiple paths and/or in a region where the density of the network of base stations is high, the suppression of the transmitting antennas featuring their main lobe in a given hemisphere does not considerably reduce the visibility of the base stations located in this hemisphere. In fact, in the first case the multiple reflections of the waves increase their probability to reach their target and in the second case the communication may be established with another available base station. Therefore, this embodiment is particularly suitable for a current use in an urban environment. On the other hand, for any other use, the addition of an omnidirectional antenna may turn out to be useful to avoid in this case losing contact with the only available base station.

According to another embodiment, each antenna is connected to its own transmitting circuit and the switches are replaced by attenuators controlled by the control element to adjust the transmit power of each antenna as a function of the result of the proximity detection. This embodiment requires that each antenna be connected to an adjustable power amplifier. As the amplifiers have a high energy consumption, this embodiment is reserved to equipment whose power consumption is not critical such as, for example, base stations of a mobile telecommunication system.

Figure 4:
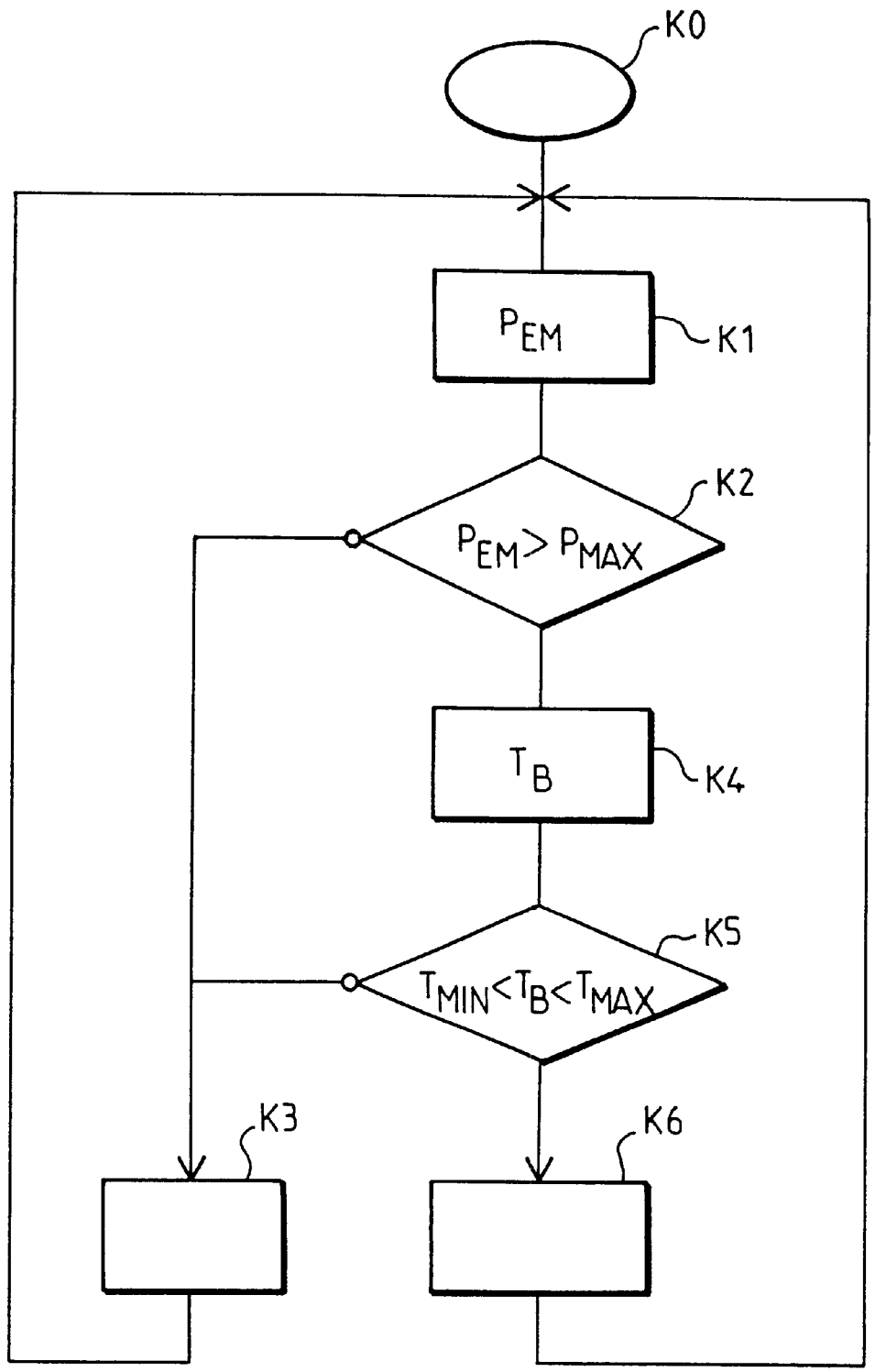
FIG. 4 is a flow chart for illustrating an example of a method of controlling transmit power according to the invention.

FIG. 4 illustrates a transmit power control method which can be realized by the control element 17 represented in FIG. 1 and integrated with the radiotelephone of FIG. 2 to control the power transmitted by a directional antenna structure.

The method starts at box K0. In box K1, the power $P_{EM}$ transmitted by the radiotelephone is read. This power may be read, for example, on the output of the power amplifier of the transmitting circuit. In box K2, the value read $P_{EM}$ is tested and compared to a set value $P_{MAX}$ representing the maximum radiation power considered unharmful to the user. If the result of this test $P_{EM} > P_{MAX}$ is negative, the method proceeds with box K3 where all the antennas are selected without a power regulation. If the result of the test is positive, the method proceeds with box K4, with a measuring step for measuring a proximity parameter for detecting the presence of a human being in the proximity of the apparatus. Depending on the preferred embodiment, this step consists of measuring the ambient temperature $T_B$ with the aid of an infrared sensor sensitive to a distance of about 20 cm. The test carried out in box K5 constitutes a comparison step between the measurement $T_B$ carried out in the preceding step and set values $T_{MIN}$ and $T_{MAX}$. If the equation $T_{MIN} < T_B < T_{MAX}$ is verified, step K6 is proceeded to for selecting suitable antennas and regulating their transmit power. If not, box K3 is returned to.

With the aid of examples a communication apparatus, telephony equipment, a base station and a power control method for modifying the radiation diagram of an antenna structure as a function of a proximity parameter have been described and illustrated. Of course it will be possible to provide variants of embodiment without leaving the scope of the invention, notably as regards the choice of the proximity parameter to be detected and the choice of the antenna structure used.

What is claimed is:

1. A radio communication apparatus comprising:
   a transceiver coupled to an antenna structure featuring a radiation diagram, said antenna structure giving greater importance to certain directions of transmission;
   a power regulation device controlled by a control element for modifying said radiation diagram; and
   a proximity detection device for measuring at least one proximity parameter and feeding the control element with a proximity indication for controlling the power regulation device, wherein the proximity detection device comprises a humidity detector.

2. An apparatus as claimed in claim 1, wherein the antenna structure comprises a plurality of directional antennas which have each a transmit power in a given direction and the power regulation device comprises power control means for regulating the transmit power of the directional antennas.

3. An apparatus as claimed in claim 2, wherein the power control means comprise a switch for selectively activating/deactivating one or various directional antennas.

4. An apparatus as claimed in claim 1, wherein the proximity detection device comprises a temperature detector.

5. Mobile radio equipment suitable for communicating with at least one radio base station of a radio telecommunication system, said equipment comprising:
   a radio transceiver coupled to an antenna structure featuring a radiation diagram which antenna structure gives greater importance to certain directions of transmission;
   a power regulation device controlled by a control element for modifying said radiation diagram; and
   a proximity detection device for measuring at least one proximity parameter and applying to the control element an indication of proximity for controlling the power regulation device, wherein the proximity detection device comprises a humidity detector.

6. A radio base station of a radio telecommunication system suitable for communicating with at least one mobile radio terminal, said radio base station comprising:
   a radio transceiver coupled to an antenna structure featuring a radiation diagram which antenna structure gives greater importance to certain directions of transmission;
   a power regulation device controlled by a control element for modifying said radiation diagram; and
   a proximity detection device for measuring at least one proximity parameter and applying to the control element a proximity indication for controlling the power regulation device, wherein the proximity detection device comprises a humidity detector.

7. A power control method for controlling the power radiated in a given direction by a plurality of directional antennas which have respective transmit powers comprising:
   measuring of at least one proximity parameter including a humidity detector for forming a measured result to detect a presence of a human being in the proximity of the apparatus,
   comparing said measured result to set values to form a comparison result, and
   selecting at least one directional antenna for regulation of its transmit power as a function of the comparison result.

8. A radio communication apparatus comprising:
   a transceiver coupled to a plurality of antennas having a radiation pattern;
   a control element;
   a power regulation device controlled by said control element for modifying said radiation pattern; and
   a proximity detector which measures at least one proximity parameter, said proximity detector including a humidity detector and said at least one proximity parameter including a humidity parameter which indicates proximity of a user of said radio communication apparatus in a direction;
   wherein said control element controls said power regulation device in response to said humidity parameter so that said radiation pattern is reduced in said direction.

9. The radio communication apparatus of claim 8, wherein said control element includes at least one switch for each one of said plurality of antennas for selectively deactivating at least one of said plurality of antennas that forms said radiation pattern in said direction.

10. The radio communication apparatus of claim 8, wherein said control element includes switches for selectively deactivating at least one of said plurality of antennas that forms said radiation pattern in said direction.

11. The radio communication apparatus of claim 8, wherein said control element includes attenuators for selectively attenuating at least one of said plurality of antennas that forms said radiation pattern in said direction.

12. The radio communication apparatus of claim 8, further comprising a plurality of adjustable gain amplifiers coupled to said plurality of antennas; said control element controlling at least one of said plurality of adjustable gain amplifiers to reduce said radiation pattern in said direction.

* * * * *